United States Patent
Niebauer et al.

(10) Patent No.: US 7,406,390 B2
(45) Date of Patent: Jul. 29, 2008

(54) ACCURATE DYNAMIC GRAVITY MEASUREMENT METHOD AND APPARATUS

(75) Inventors: Timothy M. Niebauer, Boulder, CO (US); Christopher J. M. Nind, Oakville (CA)

(73) Assignee: Micro-g Lacoste, Inc., Lafayette, CO (US)

( * ) Notice: Subject to any disclaimer, the term of this patent is extended or adjusted under 35 U.S.C. 154(b) by 0 days.

(21) Appl. No.: 11/486,626

(22) Filed: Jul. 14, 2006

(65) Prior Publication Data

US 2008/0015803 A1     Jan. 17, 2008

(51) Int. Cl.
*G01V 7/00* (2006.01)
(52) U.S. Cl. .......................................... 702/85
(58) Field of Classification Search ............... 702/85
See application file for complete search history.

(56) References Cited

U.S. PATENT DOCUMENTS 6,658,935 B1* 12/2003 Feinberg .................. 73/382 G
2004/0250614 A1* 12/2004 Ander ..................... 73/152.05
2005/0197773 A1* 9/2005 Brewster et al. ............... 702/2

OTHER PUBLICATIONS http://www.m-w.com/dictionary/gravimeter, p. 1.*
http://www.m-w.com/dictionary/gradiometer, p. 1.*
Alan T. Herring, *Introduction to Borehole Gravity*, file:///d:/boreholesurveys/edconweb/introbhg.htm, Feb. 1990, 4 pages.
J.M. Brown et al., *Preliminary Absolute Gravity Servey Results from Water Injection Monitoring Program at Prudhoe Bay*, SEG Int'l Exposition and 72 Annual Meeting, Oct. 6-11, 2002, 3 pages.
Ola Eiken et al., *Gravimetric Monitoring of Gas Production from the Troll Field*, SEG Int'l Exposition and 74th Annual Meeting, Oct. 2004, 4 pages.

* cited by examiner

*Primary Examiner*—Tung S Lau
(74) *Attorney, Agent, or Firm*—John R. Ley

(57) ABSTRACT

Gravity information for a gravity survey is obtained by using an array of relative gravimeters whose relative gravity measurement signals have been calibrated by using an absolute gravimeter to approximate absolute gravity measurements. The absolute gravimeter is moved periodically to the location of each relative gravimeter to measure absolute gravity. The absolute and relative gravity measurements for each relative gravimeter form an error signal which is used to calibrate each relative gravimeter.

23 Claims, 4 Drawing Sheets

20: ARRAY OF GRAVIMETERS
22,22a: RELATIVE GRAVIMETER
24: EARTH SURFACE
26: EARTH
28: RESERVOIR
30: GRAVITY
32: RELATIVE GRAVITY SIGNAL
34: ABSOLUTE GRAVIMETER
36: ABSOLUTE GRAVITY SIGNAL
38: DATA PROCESSING EQUIPMENT
40: CONDUCTORS
42: PUMP
44: WELL 22b,22c: RELATIVE GRAVIMETER; 30: GRAVITY 22d,22e: RELATIVE GRAVIMETER
34: ABSOLLUTE GRAVIMETER
64: CAVERN
66: SHAFT
68: ELEVATOR

22f: RELATIVE GRAVIMETER
34: ABSOLUTE GRAVIMETER
70: TOWER

ACCURATE DYNAMIC GRAVITY MEASUREMENT METHOD AND APPARATUS

This invention relates to the measurement of the magnitude of gravity. More particularly, this invention relates to a new and improved method and apparatus that uses relatively inexpensive relative gravimeters whose relative gravity measurement signals are adjusted into calibrated relative gravity measurements that are comparable in accuracy to absolute gravity measurements, and supplying those calibrated relative gravity measurements on a real-time, continuous and dynamic basis without incurring the significant cost or impracticality of using absolute gravimeters to obtain such gravity information.

BACKGROUND OF THE INVENTION

The gravitational force of attraction between two massive bodies is the force which results from the inherent natural attraction between the two bodies. The magnitude of the gravitational force is related to the mass of the bodies and is inversely related to the separation distance between centers of mass of the bodies. Gravity is measured as acceleration. For instance, and in general, 9.8 m/s$^2$ is the acceleration that a 1 gram massive object will fall toward the ground when it is thrown from the roof of a building.

A gravimeter is an instrument used to measure the strength or magnitude of gravity. Gravimeters are well known and typically measure the vertical component of the total gravity vector of the earth in units of acceleration. The common unit of measurement of gravity is the "gal," which is a unit of acceleration defined as 1 gal=1 cm/s$^2$=0.01 m/s$^2$=10$^{-3}$ g. The typical gravimeter currently measures gravity to the nearest microgal (1 µgal=10$^{-9}$ g). These types of measurements are referred to herein simply as "gravity measurements."

Gravity measurements are useful for a number of different purposes, as illustrated by the following examples. Gravity measurements are used to monitor subsurface density changes resulting from immediate to long-term subterranean events. Gravity measurements are also used to monitor the influx of water when flooding a petroleum reservoir to push hydrocarbon into extraction wells. The confinement of waste gas and liquid substances stored in subsurface caverns or containments are monitored by gravity measurements to detect whether the waste and liquid substances remain securely confined. Water management techniques make use of gravity measurements to monitor the extent to which groundwater moves or the extent to which rainwater penetrates into and saturates the soil.

In all of these uses, changes in the quantity of the substance, such as the oil, water or gas, alter the density of the volume of material at the monitored location. That change in mass, through Newton's law, changes the gravity around and above that specific monitored location. For example, in the absence of any other change, the depletion of petroleum from a subterranean reservoir decreases gravity at the point above the reservoir due to the reduction of petroleum in the reservoir. Similarly, the introduction of water to flood a petroleum reservoir increases gravity above those parts of the reservoir where the water has penetrated and replaced a less dense substance or filled a void. The movement of groundwater and waste substances from their previous location is sensed by measuring temporal changes in gravity at specific points surrounding the location. By measuring gravity, the extent of movement of the substance can be determined, and with appropriate accuracy of the measurements, volumetric quantities of the substance can also be determined.

The change in mass of the monitored substance is normally very small compared to the mass of the surrounding earth that defines the reservoir or the cavern or confinement of the substance, so the change in gravity is usually very small. Nevertheless, the change does occur and gravimeters are capable of measuring such relatively small changes in gravity. Gravimeters fall into two categories: a relative gravity measurement instrument known as a relative gravimeter, and an absolute gravity measurement instrument known as an absolute gravimeter. Both types of gravimeters measure the vertical component of the earth's total gravity vector.

A relative gravimeter suspends a mass of known quantity by a spring-like device. An increase in gravity interacts with the known mass in such a way to slightly stretch or elongate the spring-like device. Conversely, a decrease in gravity allows the spring-like device to constrict slightly. In either case, the position of the known mass changes by a slight amount due to the elongation or constriction of the spring-like device. The amount of physical displacement of the known mass is directly related to the magnitude of gravity at that location and time.

An absolute gravimeter is a technically sophisticated, more expensive and physically larger instrument than a relative gravimeter, at the present time. A mass of known quantity is positioned within a chamber which has been evacuated as much as possible to approximate a complete vacuum. A mechanism lifts the known mass and releases it to freefall within the chamber. A laser beam monitors movement of the free falling mass, and an extremely accurate clock measures the time required for the mass to fall a specific distance or measures the speed of the free falling mass at a specific time. By utilizing the distance and/or speed data, the magnitude of gravity acting upon the known mass at the time of the test is calculated.

In a relative gravimeter, the spring-like device which suspends the known mass is susceptible to many influences that degrade the accuracy of the gravity measurements obtained. Changes in temperature of the spring-like device can change its spring characteristics and hence change the displacement of the known mass. Changes in pressure can also change its spring characteristics. Shocks caused by physical movement of the gravimeter can cause an offset or tare in the at-rest position of the known mass. Changes in the spring characteristics of the spring-like device naturally occur over time and are referred to as drift. If these external environmental and characteristic influences and variations are not recognized and corrected, these influences and variations might incorrectly be interpreted as a change in gravity when measuring temporal changes in gravity.

Relative gravimeters are generally less reliable and less accurate than absolute gravimeters for measuring temporal changes in gravity. This is particularly the case when relatively small gravity influences are measured, such as subsurface density changes in subterranean reservoirs. The effect of changes in temperature, pressure, tare or drift can mask any change in the magnitude of gravity, making it impossible to accurately measure small changes in gravity.

While the accuracy of the gravity measurements obtained by using an absolute gravimeter is very high compared to the accuracy in measurements obtained by using a relative gravimeter, the sensitivity and complexity of the absolute gravimeter has made it impossible or very difficult to employ a gravimeter in any location other than in a controlled scientific laboratory where all of the environmental influences can be controlled. Only recently have field-usable absolute gravimeters been developed, but such field-usable absolute gravimeters are expensive, in the neighborhood of US $300, 000-500,000, which is roughly five times the price for a relative gravimeter. Furthermore, the use of such field-usable absolute gravimeters is tedious and time-consuming.

The relatively high cost of field-usable absolute gravimeters has had the practical consequence of requiring a single absolute gravimeter to be moved from one location to another, in order to acquire absolute gravity measurements at each of the locations. Even though movable, the sensitivity and fragility of a field-usable absolute gravimeter complicates its use. The set-up time at each location is lengthy, and care must be taken in moving the absolute gravimeter from one location to avoid damage. These factors have the effect of limiting the number of points where gravity can be measured within a specific amount of time. Under typical circumstances, absolute gravity measurements can be made at only two or three different locations in a day. As many as 300 different absolute gravity measurements may be required to complete a gravity survey of a typical petroleum reservoir. Consequently, a relatively long time is required to complete a typical absolute gravity survey.

Each absolute gravity measurement is also time-specific, becoming in effect, a "snapshot" of the gravity that exists at the time when the measurement is made. By the time that an absolute gravity survey of a petroleum reservoir is completed, the measurements can only represent an average of the gravity magnitude over the many days required to complete the survey. Because of the logistical planning and cost involved in conducting an absolute gravity survey, absolute gravity surveys are conducted quite infrequently, typically separated by one year intervals between surveys. The long time between the absolute gravity surveys results in low resolution in the ability to monitor subsurface events over time, even though the gravity measurements are very accurate when made.

Relative gravimeters are more commonly used to conduct gravity surveys. A relative gravimeter is moved from one measurement point to the next measurement point and the change in the gravity between measurement points is recorded. Periodically and before completing all the measurement points, the relative gravimeter is moved back to a reference point, referred to as a base station. The difference in the sequential measurements at the base station is distributed among the measurements collected between the sequential occupations of the base station. This type of gravity survey, where the relative gravimeter is periodically returned to the reference point to derive an error or correction value, is known as "looping." In looping relative gravity surveys, only relative or comparative gravity is measured from one point to the next, including at the base station reference point.

The comparative gravity measurements obtained in a looping relative gravity survey are used as a surrogate for absolute gravity, under the assumption that absolute gravity must be related to the comparative gravity. While there is some validity and utility to this assumption, the accuracy of the gravity measurements made in a looping gravity survey is nevertheless subject to variable influences of temperature, pressure, tare and drift on the relative gravimeter. Moreover, the time and logistics required to accomplish the looping gravity survey can be significant, particularly in rough terrain or in active locations, such as producing oil or gas fields. The added time to perform the looping relative gravity survey also diminishes the ability to monitor dynamic changes in comparative gravity.

There are many desirable reasons for determining subsurface density information on a fairly rapid, dynamic or real-time basis. For example, rapid changes in the gravity field may be indicative of water breakthroughs or leakage of waste substances from their intended locations. Both absolute and relative gravimeters have the capability of responding to more dynamic events, but their acquisition costs, drift characteristics and other factors have limited their practical use for such purposes. Consequently, accurate and dynamic gravity information for gravity surveys has not previously been available on an economic basis.

SUMMARY OF THE INVENTION

The present invention involves calibrating relative gravity measurement signals from relative gravimeters on a periodic basis with absolute gravity measurement signals from an absolute gravimeter, to make the gravity measurements from the relative gravimeters comparable in accuracy to the gravity measurements from an absolute gravimeter without the need to loop back to a gravity base station. The calibrated relative gravity measurement signals are available from the relative gravimeters on a dynamic or high frequency basis, to permit continuous or real-time monitoring subsurface density changes.

These and other aspects and improvements are accomplished by a method of obtaining gravity information using an array of relative gravimeters. Each relative gravimeter is positioned at a predetermined location in the array. Periodically an absolute gravimeter is moved to the predetermined location of each of the relative gravimeters. Gravity magnitude is measured by using the absolute gravimeter and by using the relative gravimeter at the predetermined location. The absolute and relative gravity magnitude measurements for each location are processed to determine an error value for the relative gravimeter at each location. The error value is then applied to alter the subsequent relative gravity measurement supplied by each relative gravimeter, to obtain a calibrated relative gravity measurement from each relative gravimeter. The calibrated relative gravity measurements closely approximate or are equivalent to absolute gravity measurements.

Other aspects and improvements involve apparatus for use in obtaining gravity information. An array of relative gravimeters is located at predetermined locations at or near the surface of the earth. Each relative gravimeter measures gravity and supplies a relative gravity measurement signal proportional to the magnitude of the gravity measured at its location. An absolute gravimeter is moved to the predetermined location of each relative gravimeter, where the absolute gravimeter measures gravity and supplies an absolute gravity measurement signal corresponding to the magnitude of the measured gravity. Data processing equipment receives the absolute and relative gravity measurement signals and mathematically processes the absolute and relative gravity measurement signals for each location to determine an adjustment or error value applicable to each relative gravimeter at each location. The error value is thereafter applied to alter subsequent relative gravity measurement signals into calibrated relative gravity measurement signals which are substantially equal to the absolute gravity magnitudes at the locations.

The method and the apparatus may involve some or all of the following additional features. The calibrated relative gravity measurement signals are formulated into spacial gravity survey information describing subsurface density characteristics of a subterranean structure. The calibrated relative gravity measurement signals are obtained on a continuous or a real-time basis. The gravity survey is formulated and updated using the most recently obtained calibrated relative gravity measurement signals. The error value typically includes a drift factor value that varies linearly or nonlinearly with time, and the magnitude of the error value is adjusted in relation to the amount of time that has elapsed since the error value was previously established. The error value also typically includes a substantially constant offset factor. The absolute and relative gravity magnitudes are periodically measured using the absolute and relative gravimeters, and the error value for each relative gravimeter is updated with the same periodicity that the absolute gravity is measured. Some of the relative gravimeters in the array are buried immediately below the surface of the earth, or some are buried a substantial distance below the surface of the earth, or some are elevated a substantial distance above the surface of the earth. The calibrated relative gravity measurements are used to formulate gravity difference information or gravity gradient information.

A more complete appreciation of the scope of the present invention and the manner in which it achieves the above-noted and other improvements can be obtained by reference to the following detailed description of presently preferred embodiments taken in connection with the accompanying drawings, which are briefly summarized below, and by reference to the appended claims.

DETAILED DESCRIPTION

Figure 1:
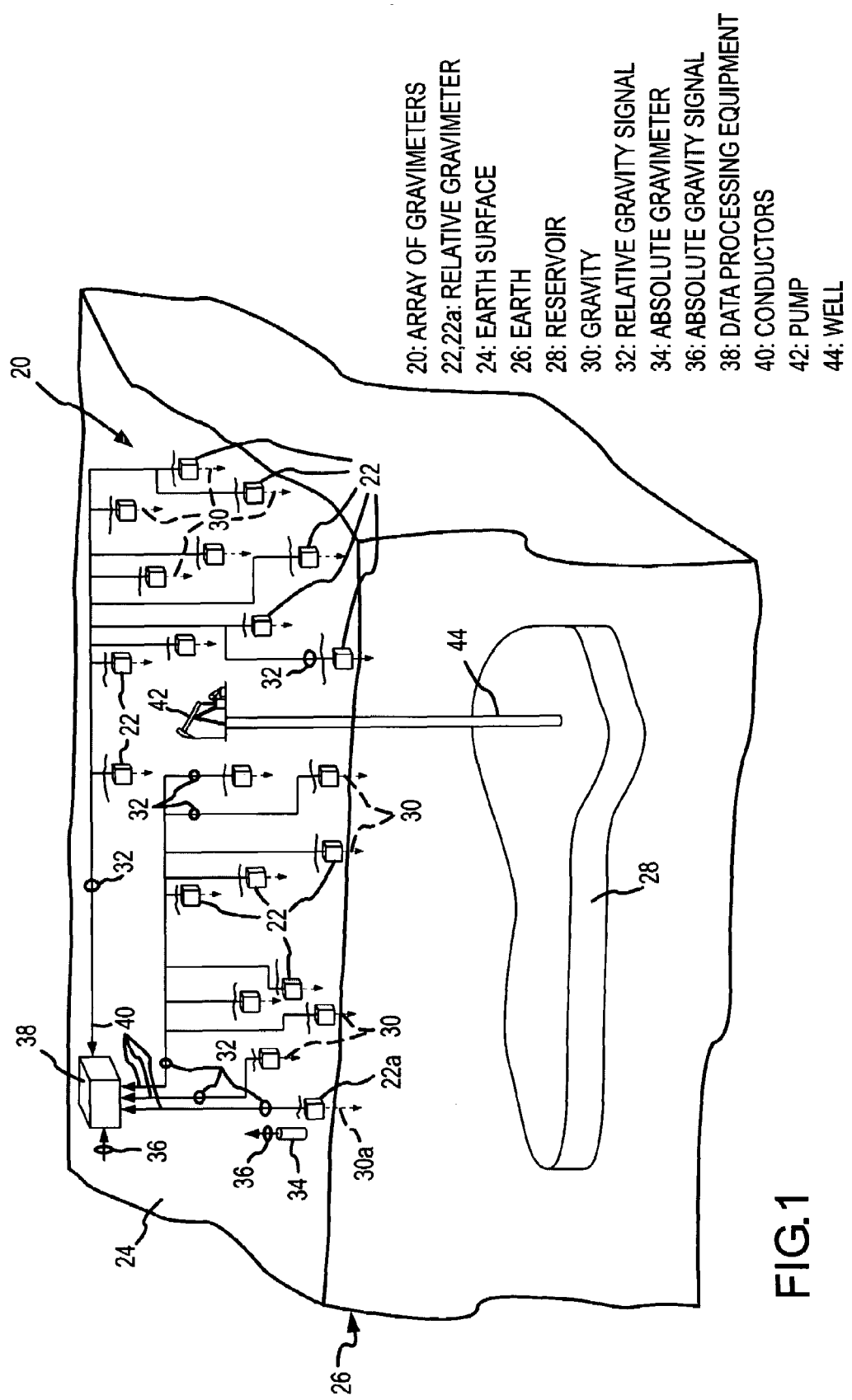
FIG. 1 is an illustration of an array of relative gravimeters positioned on the surface of the earth above a subterranean reservoir with respect to which a gravity measurement survey is derived, a single absolute gravimeter positioned relative to one of the relative gravimeters, and a data processing station to which the relative and absolute gravimeters connected, all in accordance with the present invention.
Figure 3:
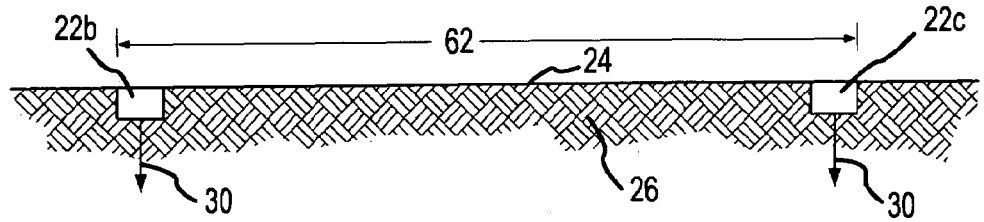
FIG. 3 is a vertical cross-sectional segment of earth showing two horizontally separated relative gravimeters used in the array of relative gravimeters shown in FIG. 1.

The invention is implemented by use of an array 20 of relative gravimeters 22, shown in FIG. 1. Each relative gravimeter 22 is located on a surface 24 of the earth 26 or buried slightly below the earth surface 24 (FIG. 3). In addition, some of the relative gravimeters 22 may be buried considerably below the earth surface 24 (FIG. 4) or elevated substantially above the earth surface 24 (FIG. 5). Each relative gravimeter 22 is positioned at a predetermined location above a subsurface or subterranean reservoir 28 or other subsurface structure or formation whose density changes are to be monitored by gravity measurements from the relative gravimeters 22. Each of the relative gravimeters 22 measures the vertical component of the magnitude of gravity 30 at its particular position and supplies a relative gravity measurement signal 32 related to the vertical component of measured gravity 30. The numbers and locations of the relative gravimeters 22 are selected to provide enough gravity measurement signals 32 to create enough gravity information to describe and characterize the subsurface density within the reservoir 28, in accordance with known principles.

The mass within the reservoir 28 determines the subsurface density of the reservoir 28, and that subsurface density influences the gravity measured by each of the relative gravimeters 22. The extent of the influence on the vertical component of the gravity 30 at each relative gravimeter 22 is related to the distance between that relative gravimeter 22 and location within the reservoir 28 where the subsurface density change occurs. Furthermore, a density change at one location within the reservoir 28 has the effect of introducing changes in the vertical components in the gravity measured by the other relative gravimeters 22, with the amplitude of the change in the gravity decreasing with the distance from the location where the density change occurs within the reservoir 28. Thus, subsurface density changes affect a number of different relative gravimeters 22 in the array 20, other than that relative gravimeter 22 vertically above the density change within the reservoir 28.

The variable influences of temperature, pressure, tare and drift, which may cause errors in the relative gravity measurement signals 32 supplied by the relative gravimeters 22, are essentially eliminated by using absolute gravity measurements supplied by an absolute gravimeter 34. The absolute gravimeter 34 is moved to the location of each of the relative gravimeters 22 in turn, for example to the location of the relative gravimeter 22a, shown in FIG. 1. While the absolute gravimeter 34 is located at or immediately adjacent to each relative gravimeter, e.g. 22a, an absolute measurement of the vertical component of the gravity, e.g. 30a, is made and an absolute gravity measurement signal 36 is supplied which corresponds to the magnitude of the vertical component of the absolute gravity measured at the location of the relative gravimeter, e.g. 22a, at that time. Approximately simultaneously, a relative gravity measurement signal 32 is obtained from that relative gravimeter, e.g. 22a.

Once the relative and absolute vertical gravity measurement signals 32 and 36 have been obtained and recorded at the location of one relative gravimeter, e.g. 22a, the absolute gravimeter 34 is moved to the location of the next relative gravimeter 22 in the array 20. Another absolute measurement of the vertical component of the magnitude of the gravity 30 at or immediately adjacent to the location of the next relative gravimeter is made, and a corresponding absolute gravity measurement signal 36 is supplied. Approximately simultaneously, a relative gravity measurement signal 32 is obtained from that next relative gravimeter 22. The same process is continued until relative and absolute gravity measurement signals 32 and 36 have been obtained for each of the relative gravimeters 22 of the array 20.

The relative gravity measurement signals 32 and the absolute gravity measurement signals 36 for each relative gravimeter 22 in the array 20 are supplied to data processing equipment 38 over conductors 40 which connect each relative gravimeter 22 to the data processing equipment 38. While the absolute gravimeter 34 is located at or adjacent to each relative gravimeter 22, the absolute gravity measurement signal 36 is also delivered over the conductors 40 to the data processing equipment 38. Once received in the data processing equipment 38, the absolute gravity measurement signal 36 is recorded and correlated to the relative gravimeter 22 from which that absolute gravity measurement signal 36 was derived.

The conductors 40 may be separate conductors extending from each relative gravimeter 22 to the data processing equipment 38, or the conductors 40 may be interconnected as a single conductor which links all of the relative gravimeters 22 upon which the relative and absolute gravity measurement signals 32 and 36 are multiplexed or networked. Alternatively, the relative and absolute gravity measurement signals 32 and 36 can be communicated wirelessly to the data processing equipment 38 by radio or light beams. As a further alternative, the relative and absolute gravity measurement signals 32 and 36 can be recorded in a portable memory device at the time that they are obtained at each relative gravimeter 22, and then this portable memory device can be connected to the data processing equipment 38 to download the recorded information describing the relative and absolute gravity measurements for each relative gravimeter.

The relative and absolute gravity measurement signals 32 and 36 are processed by the data processing equipment 38. In general, the absolute gravity measurement signal 36 is compared to the relative gravity measurement signal 32 and any difference between the two is used to develop a mathematical adjustment or error value. The error value is thereafter applied to modify or adjust each relative gravity measurement signal 32 from each relative gravimeter 22 into a corresponding calibrated relative gravity measurement signal. Adjusting each relative gravity measurement signal 32 in this manner makes the calibrated relative gravity measurement signal very closely approximate and accurately represent the absolute gravity at the position of each relative gravimeter, even though the gravity measurement signal is derived from the relative gravimeters 22. In this manner, gravity measurement signals are derived from the relative gravimeters 22 which accurately represent absolute gravity on a continuous, real-time dynamic basis without using an absolute gravimeter 34 to obtain such accuracy.

The calibrated relative gravity measurement signals are processed in a conventional manner to calculate the subsurface density information at each of the locations of the relative gravimeters 22. The calculated subsurface density information from all of the relative gravimeters 22 is combined or otherwise further processed to derive the subsurface density information concerning the reservoir 28, or other subsurface structure, and to illustrate and present those subsurface density characteristics for comprehension and use. The subsurface density changes may represent many different types of circumstances. For example, the subsurface density changes may illustrate the extent to which petroleum has been removed from the reservoir 28 by a pump 42 at a well 44, or the extent to which injected water has flooded the reservoir 28 and forced the petroleum in the reservoir 28 toward the well 44, or the extent to which liquid within the reservoir 28 has leaked from the reservoir into the surrounding subterranean formation.

Since the relative gravity measurement signals 32 are applied to the data processing equipment 38 on a continuous, dynamic and real-time basis, the calibrated relative gravity measurement signals are immediately derived and made available for use on a continuous, dynamic and real-time basis. The conversion of each relative gravity measurement signal 32 into the calibrated relative gravity measurement signal involves a relatively straightforward computational process which can be applied immediately to each new relative gravity measurement signal 32 received by the data processing equipment 38. Consequently, the calibrated relative gravity measurements closely approximate or correlate to absolute gravity measurements made on a continuous, dynamic and real-time basis, thereby providing a basis for continually updating the determinations of subsurface density changes within the reservoir 28.

Periodically, a new absolute gravity measurement signal 36 is obtained for each relative gravimeter 22. The new absolute gravity measurement signal 36 is used to update the adjustment or error value used for converting each relative gravity measurement signal 32 into the calibrated relative gravity measurement signal. In general, the time intervals between conducting the absolute gravity measurements at each of the relative gravimeters 22 are selected according to the expected rate of change of the subsurface density information within the reservoir 28 or according to the expected rate of change of the relative gravity measurement signals from the relative gravimeters 22. However, because the fixed or buried location of the relative gravimeters 22 has the effect of minimizing the variable influences from temperature, pressure and tare, the drift becomes a primary significant variable influence in the relative gravity measurement signals 32 with respect to time. Accordingly, the accuracy of the calibration is usually sufficient to extend for a significant amount of time, for example six months to one year, between subsequent absolute gravity measurements due to the relatively predictable drift characteristics of each relative gravimeter 22.

The relative gravity measurement signals 32 are transformed into the calibrated relative gravity measurement signals, thereby eliminating the errors caused by the variable influences of temperature, pressure, tare and drift, based on the recognition that the relative gravity measurement signal 32 from each relative gravimeter 22 is equal to the absolute gravity measurement signal 36 from the absolute gravimeter 34 plus the adjustment or error value which results from the variable influences. This relationship is represented by the following equation (A):

$$g_{(relative)} = g_{(absolute)} + g_{(error)}. \tag{A}$$

Subtracting the absolute gravity measurement signal 36 ($g_{(absolute)}$) from the relative gravity measurement signal 32 ($g_{(relative)}$) establishes the amount of the error ($g_{(error)}$) associated with each relative gravimeter 22. This relationship is graphically illustrated in FIG. 2. At each point in time along the horizontal axis of FIG. 2, the absolute gravity is illustrated by the curve 46 and the relative gravity is illustrated by the curve 48. The amount 50 which separates the curves of 46 and 48 corresponds to the error ($g_{(error)}$) between the absolute gravity 46 and the relative gravity 48 at any particular point in time along the horizontal axis.

By analyzing the error ($g_{(error)}$) associated with each relative gravimeter over time and by the use of multiple error calculations based on multiple absolute gravity measurements, it is possible to characterize the error ($g_{(error)}$) with a high degree of accuracy. Once characterized mathematically, the error value ($g_{(error)}$) for each relative gravimeter can be subtracted from the relative gravity measurement signal 32 (FIG. 1, but shown over time by the curve 48 in FIG. 2), and the result will be the calibrated relative gravity measurement signal which corresponds to the absolute gravity value ($g_{(absolute)}$) (shown by curve 46 in FIG. 2). In this manner, the relative gravimeters are used to obtain the calibrated relative gravity measurement signals which become almost as accurate as absolute gravity measurement signals, but on a less expensive, continuous and more dynamic or real-time basis.

The error ($g_{(error)}$) may generally be mathematically characterized as follows. In general, the error ($g_{(error)}$) from each relative gravimeter is formed by an offset value and a drift factor that are unique to each relative gravimeter. The offset value is shown at 52 in FIG. 2. The offset value is generally caused by the variable influences of temperature, pressure and tare on the relative gravimeter. Once the relative gravimeter 22 is buried slightly below the surface 24 of the earth 26

(FIG. 3) and is allowed to stabilize, the offset value will remain substantially unchanged with time. When buried, each relative gravimeter experiences a relatively uniform temperature consistent with the temperature of the earth. Each relative gravimeter experiences a consistent pressure, because each is buried at approximately the same depth and any influences from atmospheric pressure are applied to the earth surface in a consistent manner among all of the buried relative gravimeters. The buried relative gravimeters 22 are also immune from contact from external influences, such as wind, rain, animals and humans. Shielded from such external influences, the tare effects on each of the relative gravimeters remains approximately the same after the tare has stabilized. Consequently, the drift becomes the primary variable influence on the relative gravity measurement signal 32 delivered from each relative gravimeter 22 (FIG. 1).

Figure 2:
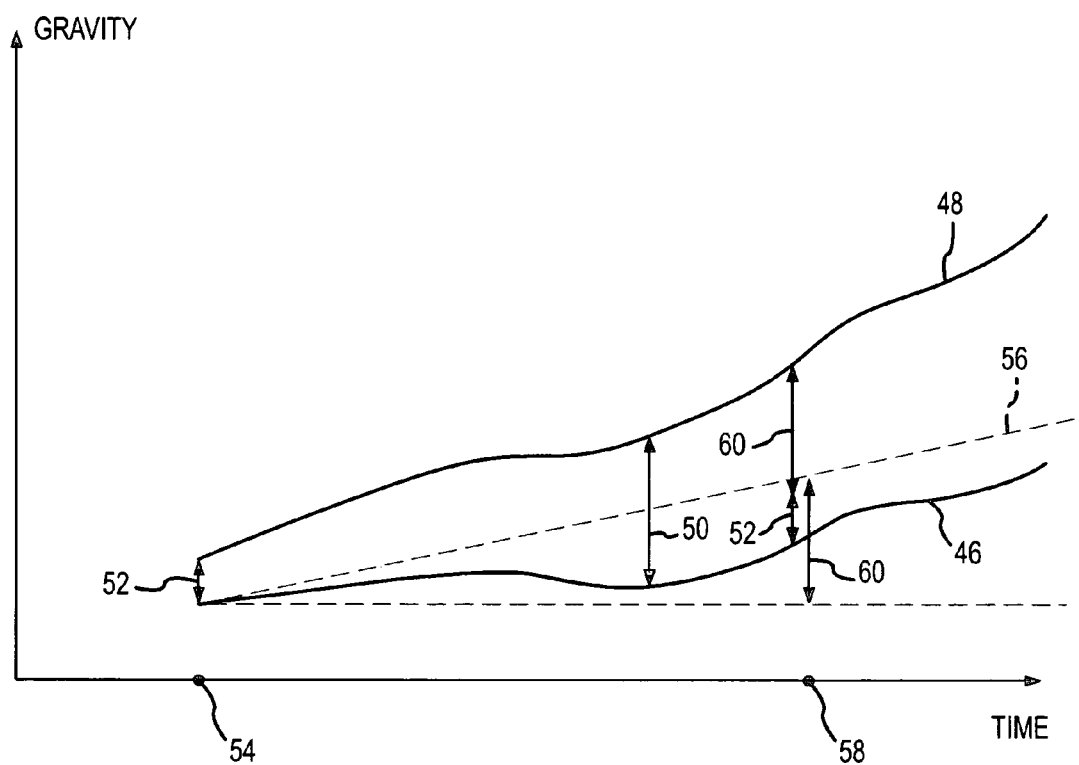
FIG. 2 is a graph illustrating a signal supplied by one of the relative gravimeters shown in FIG. 1 over a period of time compared to the absolute gravity at the location of the relative gravimeter.

The drift factor commences as a zero value at the time of calibration by use of the absolute gravimeter 34, and then the drift factor progressively changes with time. As shown in FIG. 2, the offset value 52 is the only contribution to the error 50 at the time 54 when the relationship between the curves 46 and 48 is established, i.e. at calibration, because no time exists for the drift factor to contribute to the error 50 at that time. The drift factor is characterized in relation to time, for the reasons explained above. The error 50 from each relative gravimeter therefore is represented by the following equation (B), where "d" is the drift factor and "t" is time:

$$g_{(error)} = g_{(offset)} + d \times t. \quad (B)$$

The drift factor is shown in FIG. 2 by curve 56. Curve 56 progressively increases at a constant and linear rate with time. The value of the curve 56 is therefore equal to the drift factor multiplied by time (d×t). At time point 58, the amount of drift is shown at 60. The total error ($g_{(error)}$) at time point 58 is therefore the sum of the offset 52 and the amount of drift 60.

The constant linear drift represented by curve 56 shown in FIG. 2 typically occurs from the slight natural elongation over time of the spring-like device which suspends the mass in the relative gravimeter. The elongation increases with time, and that elongation introduces an error into the relative gravity measurement signal supplied by the relative gravimeter. Although curve 56 represents the circumstance where the drift linearly increases with time, other types of drift may be applicable to a particular relative gravimeter. For example, the drift may be nonlinear or could even decrease with time if the material of the spring device undergoes a material change. The linear drift curve 56 shown in FIG. 2 is for illustration purposes.

Initially, the values of the offset 52 and the drift factor can be estimated by values determined in a laboratory. In general, the offset value 52 will remain constant, particularly if each relative gravimeter is undisturbed and is maintained at approximately the same temperature and pressure. The drift factor d, on the other hand, tends to change over time. It is usually the drift factor that introduces the significant variability in the error ($g_{(error)}$). However, the estimation of the offset and the drift parameters is improved by periodically measuring the absolute gravity at the location of each relative gravimeter.

In the case of a purely linear drift factor d, the offset and drift factors can be determined after two measurements of absolute gravity with the absolute gravimeter 34 when the two measurements are separated by a reasonable amount of time. In the case of a nonlinear drift factor d, multiple measurements of absolute gravity separated by reasonable amounts of time may be required in order to develop a more complex second or higher order polynomial mathematical representation of the drift factor. In any event, multiple measurements of absolute gravity will result in better determinations of the offset and drift values associated with each relative gravimeter.

Once a good characterization of the gravity error ($g_{(error)}$) has been obtained as a result of multiple measurements of absolute gravity, the interval between subsequent measurements of absolute gravity can be increased. The ability to characterize the gravity error ($g_{(error)}$) for each relative gravimeter provides accurate, precise, continuous, real-time calibrated relative gravity measurement signals which closely approximate absolute gravity from the location of each relative gravimeter.

Certain determinations of subsurface density may be enhanced beyond comparing differences in gravity measurements separated by time. Under those circumstances, it is desirable to measure a gravity gradient. A gravity gradient is the difference in gravity magnitude between two separated points, divided by the distance between the two separated points. In a sense, a gravity gradient is a differential in gravity magnitude over a predetermined distance. As an example of the utility of measuring a gravity gradient, the gravity gradient will reveal whether an underground cavity, area or hole is rapidly filling with water. In contrast, the difference in gravity magnitude will detect whether the cavity, area or hole has filled with water or not, but will not reflect the rate of filling. As another example, a gravity gradient is capable of determining whether groundwater is running off of a ground area or soaking into the ground area. On the other hand, a dry lake that is slowly filling up with water may not be susceptible to detection by the gravity gradient because the rate of change is too small. Under this circumstance, relative gravity measurements would determine whether the lake has filled up or not. The present invention is useful for measuring gravity gradients as well as comparative gravity differences.

The relatively high frequency or dynamic response characteristic of the present invention permits immediate determinations of changes in the gravity gradient between the relative gravimeters 22 on a real-time basis. The distance between the relative gravimeters is determined and recorded for use by the data processing equipment 38. By obtaining the difference in gravity measurement signals at the two relevant relative gravimeters 22 and dividing this difference by the distance between the two relevant relative gravimeters 22, the gravity gradient between those two relative gravimeters 22 is established.

An example of determining the gravity gradient in a horizontal sense between two relative gravimeters 22b and 22c is shown in FIG. 3. The two relative gravimeters 22b and 22c are buried within the earth 26 slightly below its surface 24. The depth of the two relative gravimeters 22b and 22c is just enough to isolate those relative gravimeters from the potentially disturbing influences present on the surface of the earth, such as contact by humans or animals, or the influences from wind, rain, temperature, pressure and the like. A distance 62 between the two relative gravimeters 22b and 22c is measured and recorded. Any changes in the density in the earth 26 and at the surface 24 of the earth between the two relative gravimeters 22b and 22c will influence the gravity measurement signals supplied by each of the relative gravimeters 22b and 22c. A change in density of the mass between the two gravimeters will also slightly modify the horizontal component of the gravity 30 measured by each of the relative gravimeters 22b and 22c. For example, a heavy rain that causes an immediate accumulation of water on the earth surface 24 will be represented by a change in the gravity gradient between the gravimeters 22b and 22c. A slower change in density caused by an accumulation of groundwater between the relative gravimeters 22b and 22c may not be shown by the gravity gradient, but would be reflected by the relative gravity measurements between the two gravimeters 22b and 22c.

Figure 4:
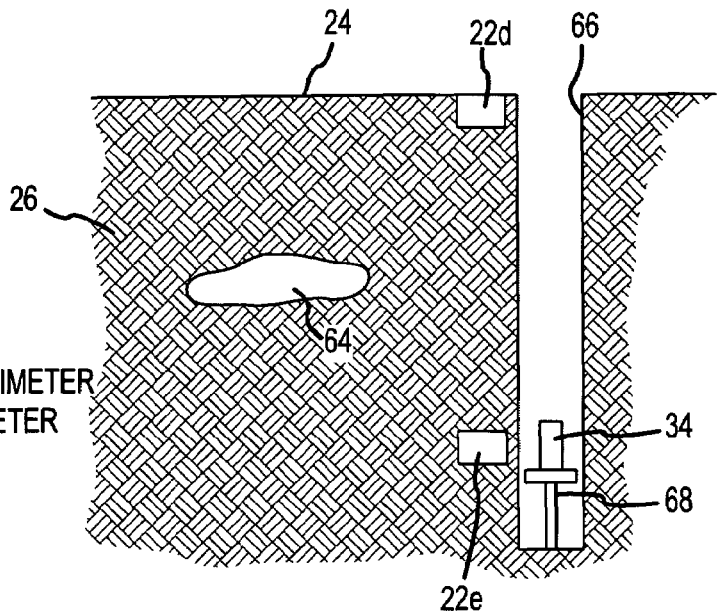
FIG. 4 is a vertical cross-sectional segment of earth showing two vertically separated relative gravimeters which may be used in the array of relative gravimeters shown in FIG. 1.
Figure 5:
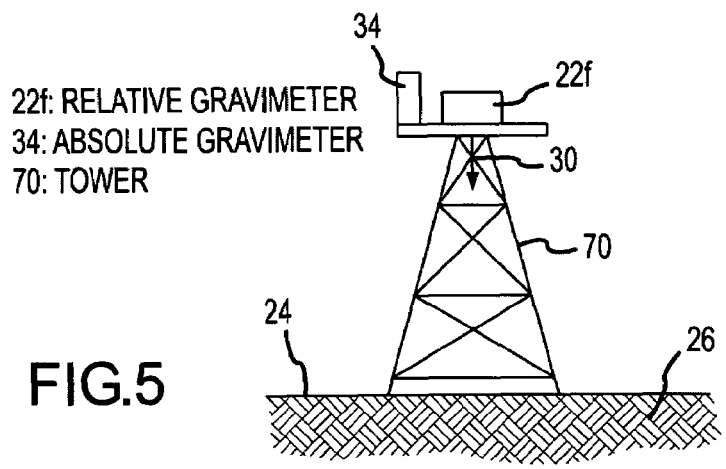
FIG. 5 is a vertical cross-sectional segment of earth and a relative gravimeter elevated above the earth surface which may be used in the array of relative gravimeters shown in FIG. 1.

An example of determining the gravity gradient in a vertical sense between two relative gravimeters 22d and 22e is shown in FIG. 4. The two relative gravimeters 22d and 22e are separated vertically, with the relative gravimeter 22d buried slightly below the surface 24 of the earth 26, while the other relative gravimeter 22e is buried considerably deeper within the earth 26. The vertical distance between the relative gravimeters 22d and 22e is measured and recorded. Any rapid changes in the subsurface density of the earth 26, such as within a subterranean cavern 64, will be determined by the vertical gravity gradient between the relative gravimeters 22d and 22e. For example, the subterranean cavern 64 may fill up with water or drain empty of water relatively quickly, in which case the relative gravimeters 22d and 22e would detect this change. On the other hand, if the cavern 64 fills with water very slowly, the relative gravity measured between the gravimeters 22d and 22e would detect that fact over time. The vertical component of the gravity measured by the relative gravimeters 22d and 22e is modified by the subsurface density change within the cavern 64, and the extent of that change in gravity magnitude is detected by monitoring either or both of the gravity gradient or difference in gravity.

Either a horizontal gravity gradient (FIG. 3) or a vertical gravity gradient (FIG. 4) can be measured and determined by the present invention. The absolute gravity measurements necessary to calibrate each relative gravimeter and to obtain the calibrated relative gravity measurement signals must be performed at the locations of the vertically spaced relative gravimeters, as well as at the locations of the horizontally spaced relative gravimeters.

To obtain absolute gravity measurements necessary to calibrate a relative gravimeter which is buried a substantial distance below the surface of the earth requires a practical method of locating an absolute gravimeter closely adjacent to a subsurface relative gravimeter. One technique of doing so is illustrated in FIG. 4. In this circumstance, the absolute gravimeter 34 is lowered through a shaft 66 on a hoist or elevator 68 until it is positioned adjacent to the relative gravimeter 22e. The absolute gravity measurement signal is obtained from the absolute gravimeter 34 while a comparable relative gravity measurement signal is obtained from the relative gravimeter 22e. The absolute and relative gravity measurement signals are thereafter processed and applied in the manner described above to create calibrated relative gravity measurements based on the relative gravity measurements from the relative gravimeter 22e. Based on the calibrated relative gravity measurement signals, gravity difference measurements as well as gravity gradient measurements are available for use.

In some circumstances, an adequate vertical gravity gradient can also be obtained by positioning one or more of the relative gravimeters 22f on an elevated support or tower 70 located above the surface 24 of the earth 26, as shown in FIG. 5. Even though located above the earth surface 24, there will nevertheless be a change in the vertical component of the gravity 30 measured by the elevated relative gravimeter 22f due to changes in density occurring within the earth below the elevated relative gravimeter 22f. Those changes are detected and used to obtain gravity difference information or gravity gradient information. To calibrate the elevated relative gravimeter 22f, an absolute gravimeter 34 is elevated on the tower 70 to a position adjacent to the elevated relative gravimeter 22f.

Elevating a relative gravimeter 22f above the earth surface 24 has the disadvantage of exposing the relative gravimeter 22f to more adverse influences, such as temperature changes, environmental effects such as wind and rain, and potential contact by animals or humans. However, to the extent that those adverse influences are tolerable, the elevated relative gravimeter 22f may provide useful and valuable gravity measurement information for gravity gradients and relative gravity differences.

Figure 6:
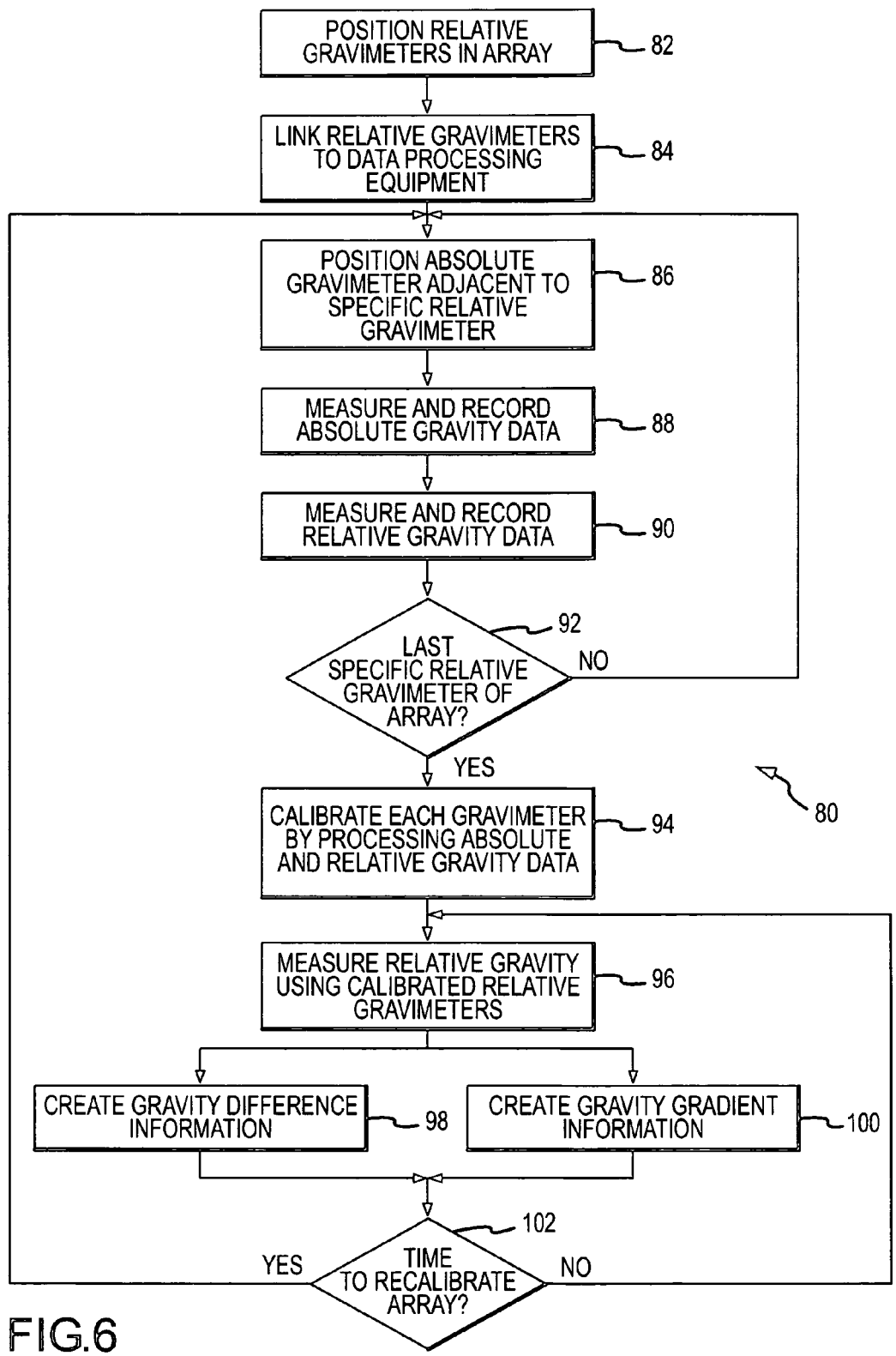
FIG. 6 is a flowchart illustrating the process flow of the present invention.

The use and functionality of the present invention is illustrated by a process flow 80, shown in FIG. 6, where each of the functions of the process flow are generally represented by separate identification numbers. The following description of the process flow 80 refers to specific items illustrated in FIG. 1.

The process flow 80 commences at 82 by positioning all of the relative gravimeters 22 at the desired and predetermined locations in the array 20. The predetermined locations may be both vertically and horizontally separated and are selected to obtain gravity information about a particular subsurface feature or structure such as the reservoir 28. If gravity gradients are to be obtained, the distances between the horizontally and vertically spaced relative gravimeters are measured and recorded. The measurements may be obtained as a result of a survey used in placing the relative gravimeters, during which the locations of the relative gravimeters 22 are established. Next, at 84, the relative gravimeters 22 are connected or linked to the data processing equipment 38. As noted previously, the linkage may be by one or more conductors 40 over which the signals may be separately conducted, multiplexed or networked, or by wireless radio or light communication of the signals, or by recording the signals and then downloading them into the data processing equipment 38, for example.

The absolute gravimeter 34 is next positioned adjacent to a specific one of the relative gravimeters 22 in the array, as indicated at 86. With the absolute gravimeter 34 located adjacent to the specific relative gravimeter 22, the absolute gravity is measured and recorded at 88. The absolute gravity measurement signal 36 is communicated from the absolute gravimeter 34 to the data processing equipment 38 where the data represented by the absolute gravity measurement signal 36 is recorded for use by the data processing equipment 38. Simultaneously or shortly thereafter the relative gravity is also measured by the adjacent relative gravimeter 22 at 90 where the data represented by the relative gravity measurement signal 32 is recorded for use by the data processing equipment 38. The relative gravity measurement signal 32 is communicated to the data processing equipment 38.

A decision is thereafter made at 92 as to whether the absolute and relative gravity measurements at each relative gravimeter within the array have been obtained. If not, the process flow loops from 92 back to 86. The steps 86, 88 and 90 are thereafter repeated for the next relative gravimeter 22. Again the decision is made at 92, and the loop back to 86 occurs until the correlated absolute and relative gravity measurement signals for all of the relative gravimeters in the array have been obtained. Once the absolute and relative gravity measurements have been obtained for each of the relative gravimeters in the array, that fact results in an affirmative determination at 92 and the process flow advances to 94.

The relative gravity measurements from each relative gravimeter in the array are thereafter transformed into the calibrated relative gravity measurements at 94 using the equations (A) and (B) described above. Adjustment or error values are obtained to convert the relative gravity measurement signals into the calibrated gravity measurement signals. It should be noted that the calibration shown at 94 could be performed in other sequences in the process flow represented by the flowchart 80. For example, each specific relative gravimeter could be calibrated immediately after the absolute and relative gravity measurement signals have been measured and recorded at 88 and 90. In any event, the calibrated relative gravity measurements are thereafter created at 96 from the uncalibrated relative gravity measurements, and the calibrated relative gravity measurements very closely match or approximate absolute gravity measurements.

The calibrated relative gravity measurements are thereafter processed in the desired manner to obtain gravity difference or gravity gradient information at 98 and 100, respectively. The gravity difference information is obtained at 98, and the gravity gradient information is obtained at 100. Processing at 98 and 100 is conventional.

The desired gravity difference and/or gravity gradient information is generated continuously on a high frequency or real-time basis, due to the continual availability of the calibrated relative gravity measurement signals from the relative gravimeters. The desired gravity difference and/or gravity gradient information is continuously obtained until a determination is made, at 102, to calibrate each of the relative gravimeters of the array once again. Until the time is reached for recalibration, as determined at 102, the gravity difference and/or gravity gradient information is generated based on using the previously calibrated relative gravity measurement signals from the calibrated relative gravimeters. The use of the previously calibrated relative gravity measurement signals from the gravimeters is illustrated by the loop back of the process flow from 102 to 96. However, when it has been affirmatively determined at 102 that the entire array of relative gravimeters should again be recalibrated by making absolute gravity measurements with the absolute gravimeter 34 at each relative gravimeter 22, the process flow loops from 102 back to 86. Thereafter, the process flow represented at 86-102 is again accomplished in the manner described above.

In general, the time interval between recalibrations of the array of relative gravimeters may be affected by a variety of different influences. However, the periodicity between recalibrations will generally become longer as the entire array becomes more settled and stable after prolonged periods of time. In addition, it may be necessary to recalibrate only some relative gravimeters in the entire array, depending upon the performance and response of those relative gravimeters.

As has been described above, one principal benefit of the present invention is that it allows relatively inexpensive relative gravimeters to achieve the accuracy of relatively expensive absolute gravimeters when conducting a gravity survey or a gravity gradient survey. The calibrated relative gravity measurement signals exemplify the accuracy of absolute gravity measurement signals. Another principal benefit of the present invention is that the calibrated relative gravity measurement signals are available on a continuous, dynamic or real-time basis, thereby permitting more accurate and dynamic determinations of gravity differences and gravity gradients than could be obtained by using only an absolute gravimeter or the relative gravimeters. Thus, the information relating to gravity differences and gravity gradients is available on a rapid and continuous basis as well as on a more accurate basis. Many other advantages and improvements are described above and will become more apparent upon fully appreciating the aspects of the present invention.

Presently preferred embodiments of the present invention and many of its improvements have been described with a degree of particularity. This description is of preferred examples of the invention, and is not necessarily intended to limit the scope of the invention. The scope of the invention is defined by the following claims.

The invention claimed is:

1. A method of obtaining gravity information having an accuracy comparable to absolute gravity information by using an array of relative gravimeters to obtain gravity information for determining characteristics of a subsurface structure located beneath the surface of the earth, comprising:
   positioning each of the relative gravimeters in the array at predetermined stationary locations at the surface of the earth;
   moving an absolute gravimeter to each of the predetermined locations of each of the relative gravimeters;
   making absolute gravity measurements using the absolute gravimeter and making relative gravity measurements using the relative gravimeter, while the absolute gravimeter is positioned at the predetermined position of each relative gravimeter;
   processing the absolute and relative gravity measurements obtained when the absolute gravimeter is at the position of each relative gravimeter to determine an error value for each relative gravimeter; and
   applying the error value to alter subsequent relative gravity measurements supplied by each relative gravimeter into calibrated relative gravity measurements which closely approximate absolute gravity at the predetermined location of each relative gravimeter in the array.

2. A method as defined in claim 1, further comprising:
   supplying the calibrated relative gravity measurements on a continuous basis.

3. A method as defined in claim 1, further comprising:
   supplying the calibrated relative gravity measurements on a real-time basis.

4. A method as defined in claim 1, further comprising:
   adjusting the magnitude of the error value for each relative gravimeter in accordance with a drift factor which varies with time and in relation to the amount of time which has elapsed from the time when the absolute gravity measurement was last made for each relative gravimeter.

5. A method as defined in claim 1, further comprising:
   formulating a gravity survey of the subsurface structure from the calibrated relative gravity measurements.

6. A method as defined in claim 1, further comprising:
   communicating the absolute and relative gravity measurements from the predetermined location of each relative gravimeter to a central location at the time that the absolute gravimeter measures absolute gravity at the position adjacent to the relative gravimeter; and
   processing the absolute and relative gravity measurements to determine the error value for each relative gravimeter and applying the error value to obtain the calibrated relative gravity measurements at the central location for each subsequent relative gravity measurement.

7. A method as defined in claim 1, further comprising:
   periodically making the absolute and relative gravity measurements using the absolute and relative gravimeters, respectively;
   updating the error value for each relative gravimeter at the same periodicity as the absolute and relative gravity measurements are periodically made; and
   applying the updated error value to alter subsequent relative gravity measurements supplied by each relative gravimeter into the calibrated relative gravity measurements until the next subsequent absolute and relative gravity measurements are made.

8. A method as defined in claim 4, further comprising:
adjusting the magnitude of the error value by applying a drift factor value that varies linearly with time.

9. A method as defined in claim 4, further comprising:
adjusting the magnitude of the error value by applying a drift factor value that varies with time.

10. A method as defined in claim 4, further comprising:
establishing the magnitude of the error value by applying an offset factor which is invariable with respect to time.

11. A method as defined in claim 4, further comprising:
periodically making the absolute and relative gravity measurements using the absolute and relative gravimeters, respectively;
updating the error value for each relative gravimeter at the same periodicity as the absolute and relative gravity measurements are periodically made; and
applying the updated error value to alter subsequent relative gravity measurements supplied by each relative gravimeter into the calibrated relative gravity measurements.

12. A method as defined in claim 5, further comprising:
continuously updating the gravity survey using the most recently obtained calibrated relative gravity measurements.

13. A method as defined in claim 5, further comprising:
positioning at least some of the relative gravimeters in the array in the predetermined locations above the subsurface structure; and
burying some relative gravimeters of the array below the surface of the earth.

14. A method as defined in claim 5, further comprising:
positioning at least some of the relative gravimeters in the array in the predetermined locations above the subsurface structure; and
elevating at least one of the relative gravimeters of the array above the surface of the earth.

15. A method as defined in claim 5, further comprising:
using the calibrated relative gravity measurements to obtain gravity difference information at the predetermined location of at least one relative gravimeter relative to at least one other relative gravimeter of the array; and
using the gravity difference information in formulating the gravity survey.

16. A method as defined in claim 5, further comprising:
determining the distance between at least two of the relative gravimeters in the array;
dividing the difference of the calibrated relative gravity measurements from the two relative gravimeters by the distance between the two relative gravimeters to obtain gravity gradient information; and
using the gravity gradient information in formulating the gravity survey.

17. A method as defined in claim 5, further comprising:
determining the distances between all of the relative gravimeters in the array;
dividing the difference of the calibrated relative gravity measurements between pairs of the relative gravimeters by the distance between the pairs of the relative gravimeters to obtain gravity gradient information with respect to all of the relative gravimeters in the array;
using the gravity gradient information with respect to all of the relative gravimeters in the array in formulating the gravity survey.

18. A method as defined in claim 11, further comprising:
increasing the time of periodicity between subsequent measurements of the absolute and relative gravity of the entire array.

19. A method as defined in claim 13, further comprising:
burying at least one of the relative gravimeters of the array a greater distance below the surface of the earth than at least one of the other relative gravimeters is buried.

20. Apparatus for use in obtaining gravity information, comprising:
an array of relative gravimeters located at predetermined stationary locations at the surface of the earth, each relative gravimeter measuring gravity at the predetermined location and supplying a relative gravity measurement signal corresponding to the gravity measured at the predetermined location;
an absolute gravimeter which is movable to the predetermined location of each relative gravimeter, the absolute gravimeter measuring gravity at the predetermined location of the relative gravimeter and supplying an absolute gravity measurement signal corresponding to the gravity measured at the predetermined location of the relative gravimeter; and
data processing equipment connected to the absolute and relative gravimeters to receive the absolute and relative gravity measurement signals, the data processing equipment processing the absolute and relative gravity measurement signals for each relative gravimeter of the array to determine an error value applicable to each relative gravimeter of the array, the error value related to the difference between the relative and absolute gravity measurement signals at each relative gravimeter, the data processing equipment thereafter applying the error value to alter subsequent relative gravity measurement signals supplied by each relative gravimeter into calibrated relative gravity measurement signals, each calibrated relative gravity measurement signal approximating the absolute gravity at the predetermined location of each relative gravimeter at the time that the subsequent relative gravity measurement is supplied by each relative gravimeter, the data processing equipment supplying the calibrated relative gravity signals as the gravity information.

21. Apparatus as defined in claim 20, wherein:
the error value includes a drift factor value which varies with time; and
the data processing equipment adjusts the magnitude of the error values for each relative gravimeter in relation to the amount of time which has elapsed from the time since the last absolute gravity measurement signal was obtained for each relative gravimeter.

22. Apparatus as defined in claim 20 for use in conducting a gravity survey on a subterranean structure located beneath the surface of the earth, wherein:
the data processing equipment formulates the calibrated relative gravity measurement signals into gravity survey information characterizing the subsurface density of the subterranean structure.

23. Apparatus as defined in claim 21, wherein:
the data processing equipment periodically updates the error value to alter subsequent relative gravity measurement signals supplied by each relative gravimeter into the calibrated relative gravity measurement signals, after receiving the next subsequent absolute gravity measurement signal for each relative gravimeter.

* * * * *